United States Patent [19]
Faulkner

[11] 3,870,664
[45] Mar. 11, 1975

[54] RESINOUS REACTION PRODUCT OF A SUCROSE PARTIAL ESTER, A CYCLIC DICARBOXYLIC ACID ANHYDRIDE AND A DIEPOXIDE

[75] Inventor: Raymond Noel Faulkner, Esher, England

[73] Assignee: Research Corporation, New York, N.Y.

[22] Filed: Jan. 10, 1974

[21] Appl. No.: 432,135

[30] Foreign Application Priority Data
Jan. 19, 1973  Great Britain ...................... 3010/73

[52] U.S. Cl. .......... 260/9, 260/17.4 SG, 260/18 EP, 260/78.4 EP
[51] Int. Cl. ............................................. C08b 25/00
[58] Field of Search .......................... 260/9, 17.4 SG

[56] References Cited
UNITED STATES PATENTS

| | | | |
|---|---|---|---|
| 2,123,206 | 7/1938 | Robinson | 260/9 |
| 2,890,196 | 6/1959 | Phillips et al. | 260/78.4 EP |
| 2,970,142 | 1/1961 | Hass | 106/162 |
| 3,084,137 | 4/1963 | Nowlin et al. | 260/9 |
| 3,520,841 | 7/1970 | Graver et al. | 260/18 EP |
| 3,527,720 | 9/1970 | Groff | 260/18 EP |

OTHER PUBLICATIONS

Chem. Abst. 72: 112255e, 1970, Case et al., "Polyurethanes."
Chem. Abst. Vol. 65: 1966 Socony, "Monameric Polyester-Polyols."

*Primary Examiner*—Morris Liebman
*Assistant Examiner*—Edward Woodberry

[57] ABSTRACT

Oil-modified sucrose resins are obtained by reacting a sucrose partial ester, containing from about one to five ester groups per molecule of sucrose, with a cyclic dicarboxylic acid anhydride and a diepoxide, Preferably the reaction takes place in the presence of an alkaline catalyst. A process is provided for producing these resins. Coating compositions containing these resins are provided.

28 Claims, No Drawings

RESINOUS REACTION PRODUCT OF A SUCROSE PARTIAL ESTER, A CYCLIC DICARBOXYLIC ACID ANHYDRIDE AND A DIEPOXIDE

BACKGROUND OF THE INVENTION

This invention relates to oil-modified sucrose resins which can be prepared using sucrose as a starting material and which are useful in coating compositions, such as paints, and to the preparation of such resins.

Sucrose is a widely available compound which is relatively cheap and of high purity. It could therefore be an excellent starting material for the preparation of many organic materials except that it has the disadvantages of being unstable to heat, it tends to hydrolyze readily under acid conditions and is insoluble in most common organic solvents. It is, therefore, generally difficult to react it economically.

The reaction of sucrose with an ester of a drying oil fatty acid and a volatile lower alochol to give a sucrose partial drying oil ester has been described in U.S. Pat. No. 2,970,142. While these sucrose partial esters are said to be useful as drying oils in paints and coatings, they are not significantly superior to the classical unsaturated fatty acid ester oils, such as linseed stand oil, used in paints.

It is therefore an object of this invention to provide resins using sucrose as a starting material which are capable of use in the formation of paint films and other coatings and which can be comparable with the best modern alkyd resins.

Other objects of the invention will be apparent to those skilled in the art from the present specification.

GENERAL DESCRIPTION OF THE INVENTION

According to the present invention there is provided the reaction product of a sucrose partial ester, e.g., of a vegetable oil fatty acid, a marine oil fatty acid or a synthetic fatty acid, with a cyclic dicarboxylic acid anhydride and a diepoxide.

This reaction product is an oil-modified sucrose resin which is air-drying and can be readily cured upon exposure to air for short periods of time in the presence of paint driers such as cobalt and lead naphthenates. The resulting dried or cured resins give films which have comparable properties to dried films of air-dried alkyd resins.

The sucrose resins of the invention, can be incorporated in paints or other coating compositions which have rapid drying time and desirable flow properties during application to a surface. The resulting cured coatings have desirable flexibility, hardness and non-yellowing properties, and they have a good resistance to saponification by cold alkalies, e.g., as produced by the galvanic action of steel corrosion. Further they have good gloss retention during weathering and good overcoating properties when repainting after weathering. The resins can also have good water resistance, this water resistance being better the lower the acid value of the final resin.

When the sucrose resins of the invention are employed in paints or other coating compositions they disperse satisfactorily with paint pigments such as titanium dioxide pigment or tinting pigments such as phthalocyanine blue or red iron oxide.

The sucrose partial ester starting material can, for example, be prepared as described in the above noted U. S. Pat. No. 2,970,142. The partial esters can contain from 1 to 5 ester groups and it appears that the larger the number of ester group substituents the more stable will be the resulting sucrose resin and also the more stable to heat will be the reactants during reaction. Therefore, while the partial esters can contain any number of ester group substituents from 1 to 5, we presently prefer that the partial ester contains an average of between 4 and 5 and desirably as near 5 as possible ester group substituents, per sucrose molecule.

The sucrose resins of the invention have the general formula:

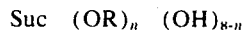

$$\text{Suc} \ (OR)_n \ (OH)_{8-n}$$

where each R group represents one of the ester groups as set out below, Suc a sucrose molecule, and n is an integer from 1 to 5.

Examples of suitable sucrose ester groups may be derived from vegetable oil or marine oil unsaturated fatty acids of the drying oil type, e.g., linseed and tung oils, of the semi-drying oil type, e.g., soya oil, tall oil or dehydrated castor oil, or of the non-drying oil type, e.g., olive oil, coconut oil or castor oil, or mixtures of drying oil type and/or semi-drying oil types and/or non-drying oil types. Examples of suitable vegetable oil or marine oil fatty acids from which the ester groups may be derived are described, for example, in "The Chemistry of Organic Film Formers" by D. H. Solomons, published by J. Wiley in 1967. The esters can also be derived from fatty acids and aromatic acids such as, for example, benzoic acid.

It is preferred that a large proportion of the sucrose ester groups be derived from these non-drying oil or semi-drying oil types or their mixtures rather than wholly from the drying oil type, since the presence of drying oil chains in the final sucrose resin provides a chain which is more reactive after curing of the resin and so reaction continues with the resulting coating compositions becoming more brittle and tending to yellow with age.

The sucrose resins of the invention which have been prepared from sucrose partial esters where the ester groups have been derived from dehydrated castor oil have excellent properties such as flexibility, which do not deteriorate markedly with time during weathering.

Where the ester groups on the sucrose esters have been derived from drying or semi-drying oils the resulting sucrose resins will dry or cure upon exposure to air. Where the ester groups have been derived from semi-drying oils containing conjugated unsaturation, e.g., dehydrated castor oil, or non-drying oils such as laurate ester groups in coconut oil, the resulting sucrose resins can be incorporated into paints and other coating compositions which are useful as stoving finishes.

Among the sucrose partial esters which may be employed in the present invention are the dilinseedate, trilinseedate, tri(3:1)linseedate-tungate, trilinseedate-monotungate, trilinseedate-monoolivate, dilinseedate-dilaurate, monolinseedatetrisoyate, trisoyate, tetrasoyate, tallate and mixed drying oil esters and benzoate esters.

As described in U.S. Pat. No. 2,970,142 the sucrose partial esters are preferably prepared by reaction in the presence of alkaline catalysts. Suitable catalysts include the alkali-metal and alkaline-earth metal salts, such as potassium carbonate. During the preparation of these sucrose esters significant amounts of alkali-metal soaps, e.g., potassium soaps, are formed by reaction of, for example, potassium carbonate catalyst, with free acids present in the methyl fatty esters or by alkaline hydrolysis of these esters.

The presence of those soaps has an adverse effect on water resistance and gloss of sucrose resins of the invention when used in paints and so generally it is desirable to remove the considerable portion from the sucrose esters before they are used.

The substantially complete removal can be carried out for example by shaking a solution of the sucrose ester in methyl ethyl ketone with dilute hydrochloric acid and sodium chloride solution or dilute potassium bisulphate to give a product containing fatty acids liberated from the soaps. In the resin forming reaction between sucrose dihalf ester intermediate and diepoxide, an additional amount of diepoxide is therefore required for reaction with the free fatty acids. Alternatively, a portion of the soaps can be removed by shaking a solution of the sucrose ester in hexane with aqueous zinc or calcium sulphate to precipitate relatively insoluble zinc or calcium soaps by double decomposition. This method is less satisfactory due to the difficulty of obtaining efficient mixing of the reactants. The soaps can also be removed by the use of ion-exchange resins, for example, as in U.S. Pat. No. 3,480,616.

In general, purified sucrose esters are light yellow in color and give paler resins than those from crude esters.

Sucrose esters prepared according to the method described above contain unreacted methyl esters which are found to have some plasticizing effect on the final resin to improve its flexibility. For example, a typical product from reaction of sucrose with five mole proportions of methyl esters of dehydrated castor oil fatty acids contained about 15 to 20% unreacted methyl ester as determined by distillation in a pot molecular still.

The cyclic dicarboxylic acid anhydrides are those where the anhydride group forms part of the ring. This in effect means that the two carboxyl groups are adjacent to one another in the molecule or are sufficiently close to one another to enable an internal rearrangement of the two carboxyl groups to rearrange to form an anhydride group.

Amongst the anhydrides which may be employed are aromatic and aliphatic dicarboxylic acid anhydrides, such as dodecenylsuccinic, nonenylsuccinic, soybean fatty acid/maleic anhydric adduct (Admerginate acid), tetrahydrophthalic, maleic, phthalic and succinic anhydrides. The preparation of the soybean fatty acid/-maleic anhydric adduct is described in detail by Danzig, et al., in The Journal of the American Oil Chemists' Society, Vol. 34, pp. 136-138 (March 1957).

The residues (of which the anhydride forms part) form side chains in the final sucrose resin. Where this residue is an aliphatic chain this preferably has from 3 to 12 carbon atoms, the longer chain lengths giving a more flexible final resin since these groups act as an internal plasticizer for the resin. Where this residue contains aromatic, e.g., aryl, groups such as phthalate groups, less flexible final resins are given.

One can also increase the flexibility of the final resins, sometimes at the expense of hardness, by replacing a part of the anhydride by a dimer fatty acid, such as soya dimer fatty acid. It appears that this is because of the incorporation of a long aliphatic chain in the final resin. This replacement of part of the anhydride to improve flexibility is particularly useful where higher molecular weight diepoxides are used.

Among the diepoxides which may be employed are bisphenol A diglycidyl ether, vinyl cyclohexene diepoxide often otherwise known as vinyl cyclohexene dioxide (available from Bakelite under the name E.P. 206), diepoxide oligomers from disphenol A diglycidyl ether, diepoxide novolacs and butylene-2,4-diglycidyl ether. Some diluent epoxides may additionally be present, e.g., butyl glycidyl ether and allyl glycidyl ether. The most widely and cheaply commercially available diepoxide is bisphenol A diglycidyl ether and so its use is preferred. Also it is found that sucrose resins in accordance with the invention which have been prepared from relatively high molecular weight diepoxides such as bisphenol A diepoxides are particularly useful in coatings which require a high resistance to abrasion, weathering and chemicals. The particular diepoxide chosen should not, however, be of too high a molecular weight or of a bulky type which since for each of reaction it should preferably be soluble or miscible in normal paint solvents so as to give a homogeneous reaction mixture as will be described in due course.

The reaction between the sucrose partial ester, the cyclic dicarboxylic acid anhydride and the diepoxide can be effected by heating all three reactants together or by heating a mixture of the sucrose partial ester and the cyclic dicarboxylic acid anhydride to give a sucrose dihalf ester intermediate and then this intermediate can be heated with the diepoxide to give the desired sucrose resin of the invention. The choice of whether to effect the reaction in one or two stages is often limited by the strength of the cyclic anhydride. Thus, with strong half acids, such as phthalic anhydride or maleic anhydride, the reaction should be effected in one stage if good yields are to be achieved; otherwise the strong acidic groups present may lead to substantial decomposition and charring of the sucrose.

The temperature of the reaction affects not only the rate of reaction, but also the extent of decomposition of the sucrose. Thus, if the reaction mixture is held at temperatures in excess of 120°C. for long periods of time decomposition and charring may occur. The reaction, either as a single stage or as two stages, is therefore desirably effected at temperatures of from 20° to 120°C., with temperatures of from 100° to 110°C. preferred. It is found that the larger the number of ester group substituents on the sucrose molecule the more stable is the resulting sucrose partial ester. Therefore higher temperatures can be employed to give more rapid reaction rates when there are a larger number of ester group substituents on the sucrose molecules without risk of increasing decomposition of the reactant or reactants. In practice we have found that reaction temperatures in the region of, or above, 140°C. can be used when the sucrose molecules are penta-substituted.

The reaction to give the sucrose resins of the invention is preferably effected in the presence of an alkaline catalyst so as to achieve satisfactory rates of reactions. Where a crude sucrose ester is used containing an alkali soap such as a potassium soap, this soap is found to be an efficient catalyst. When the sucrose ester is substantially soap-free, e.g., after purification or prepared in a manner which avoids the production of the soap, alkaline catalysts, such as benzyl dimethylamine, can be added to achieve a satisfactory rate of reaction. Where the initial sucrose partial ester has been purified to remove substantially all alkaline soaps and say an amine catalyst is used, the final sucrose resin may be a relatively dark product when the sucrose partial ester is, for example, dehydrated castor oil. However, if the initial sucrose partial ester for example, dehydrated castor oil, is partially purified to remove some alkaline soaps with say a zinc salt, and amine is added as a catalyst, the resulting sucrose resin is relatively pale in color. In some cases, therefore, it may be preferable to effect this partial purification and then add a further alkaline catalyst.

The reaction is preferably effected in a solvent. The solvent should be chosen so that at least the sucrose ester and the anhydride are soluble so as to give a homogeneous reaction mixture. In the case of a two stage process the same solvent can be used for both stages of the reaction although one may add a more powerful solvent for the second stage if required to maintain a homogeneous reaction mixture. The choice of solvent depends to some extend upon the molecular weight of the diepoxide. Thus, an inexpensive paint solvent, such as white spirit or xylene, is suitable for use with lower molecular weight diepoxides, xylene is suitable with the diepoxide sold as Epikote 834, and a more powerful solvent such as Cellosolve acetate optionally together with xylene, is required for the higher molecular weight diepoxide sold as Epikote 1001.

In the first stage of the reaction in the case of a two stage process or as the first step of a single stage reaction, a condensation occurs between the anhydride and the sucrose partial ester to give the sucrose dihalf ester. Assuming pure reactants, the condensation occurs in the proportion of two moles of the anhydride per mole of sucrose partial ester and so these two reactants are preferably reacted in substantially this relative proportion. While on average two molecules of the anhydride will condense with one molecule of the sucrose partial ester, this will be an average and the intermediate will be a mixture containing predominantly the dihalf ester intermediate made by condensing one molecule of the sucrose partial ester and two molecules of the anhydride plus mono-, tri- or higher-half ester intermediates made by condensing one molecule of the sucrose partial ester with 1,3 or even more, respectively, anhydride molecules.

In the second stage of the reaction, whether this be in the form of a separate reaction or the second reaction of a single stage, the intermediate is condensed with the diepoxide. Generally from 0.7 to 3 moles of the diepoxide per mole of the sucrose partial ester are reacted. The exact proportion used in any case will depend upon the composition of the intermediate and the degree of cross-linking (flexibility) required in the final sucrose resin. Theoretically, 1 mole of the diepoxide will react with 1 mole of the di-half ester intermediate, but as pointed out above, the intermediate will not be exclusively the di-half ester and so the proportion of diepoxide should preferably be chosen to give substantially complete condensation.

The epoxide used need not be a pure diepoxide, and instead the epoxide reacted can contain a major amount of diepoxide together with some mono-, tri- or higher epoxides so as to give complete condensation. Thus, since the various reactants will be mixtures, the proportion of epoxide which is not diepoxide can be chosen so as to give substantially complete reaction, and the desired degree of cross-linking in the final resin and the desired average molecular weight of the final resin since naturally the reaction of a mono-epoxide molecule will terminate the chain-extension reaction. Also, the replacement of some of the diepoxide can reduce the acid value of the final resin and so improve its water resistance.

In the case where phthalic anhydride, or another anhydride having strong acid groups, such as maleic or succinic anhydride is the anhydride used, we have found that it is preferable to use no more than 0.75 mole of the diepoxide per mole of the partial sucrose ester because we have found that with proportions of diepoxide above 0.75 mole (up to about 1 mole) per mole of the partial sucrose ester, the resin product contained increasing amounts of gel. This is probably due to side esterification reactions between the strong acid groups of the phthalic half ester and the hydroxyl groups formed by ring-opening of the epoxide so giving intermediates of increased functionality. Then to ensure reaction of any spare carboxyl groups of the half-ester intermediate one can add to the reaction mixture a mono-epoxide such as butyl glycidyl ether and reduction of the acid value of the resins in this way improves the water resistance of the resins. Also, anhydrides having strong acid groups are desirably not used with diepoxide oligomers having at least one hydroxyl group in addition to those formed by reaction of the epoxide group since a gel is often formed, whether the reaction be conducted in one or two stages.

In addition to ring opening of epoxide by the half-ester carboxyl groups (to give hydroxy esters) or between carboxyl and hydroxyl groups (to give esters), reactions between epoxide and hydroxyl groups (to give ethers) are also possible depending on reaction conditions, e.g., temperature and presence of amine catalyst. The chemistry of these reactions is well known (see W. G. Potter "Epoxide Resins," Plastics Institute Monograph, Iliffe Books, London, 1970, and W. Lee and K. Neville, "Handbook of Epoxy Resins," McGraw-Hill Inc., 1967).

The sucrose resins of the invention have the advantage that they can be made water-dispersible in the presence of cosolvents, such as butyl cellosolve (monobutyl ether of ethylene glycol), by conversion of carboxyl groups in the resin to salt groups. This can be achieved by reacting the resins with ammonia or a tertiary amine, such as triethylamine, pyridine, or dimethyl aniline. Before treatment to give this salt, any free hydroxy groups can first be esterified with a cyclic anhydride, such as Admerginate acid or phthalic anhydride, to provide additional carboxyl groups for salt formation, e.g., so as to give the resin an acid value of at least 40 to 50. The treated resins which have been made water-dispersible are useful as coating compositions. For example, the treated resin can be electrophoretically deposited on an article to be coated followed by stoving to give a cured coating.

The sucrose resins of the invention are useful in coating compositions or paints on all substrates, e.g., wood and metals.

DETAILED DESCRIPTION OF THE INVENTION

The invention will now be illustrated by the following examples in which all quantities of material are expressed in terms of parts or percentages by weight, unless otherwise specified, and in which the scratch hardness of coatings was measured by the maximum resistance to scratching of coatings on aluminum with a 1 mm. diameter ball under varying loads, according to British Standard 3900, Part E2.

EXAMPLE 1

(Preparation of drying oil resin from sucrose trilinseedate, dodecenyl succinic anhydride and bisphenol A diglycidyl ether using 0.74:1 mole ratio of diepoxide/di-half ester).

Sucrose trilinseedate was prepared according to U. S. Pat. No. 2,970,142 by interesterifying 17.1 grams (0.05 mole) of sucrose with 43.5 grams (0.15 mole) of methyl esters of linseed fatty acids in 27 ml. dimethyl sulphoxide at 90° to 100°C. and 50 mm. pressure under nitrogen using 3.5 grams dry potassium carbonate as catalyst. During three hours, 4.8 grams (0.15 mole) of methyl alcohol were distilled over into a cold trap. The reaction mixture was cooled and filtered through muslin to remove the catalyst and dimethyl sulphoxide recovered by distillation under vacuum on a rotary evaporator, finally at 1 mm. pressure.

The product, 56.1 grams (0.05 mole) of crude sucrose trilinseedate, was dissolved in 56 grams of white spirit and heated for two hours at 100°C. under nitrogen with 26.6 grams (0.1 mole) of dodecenyl succinic anhydride. The acid value of the reaction mixture was 34 mg. of potassium hydroxide per gram using either acetone or a mixture of ethanol and xylene as solvent in the titration with standard aqueous alkali. This result indicated that unreacted anhydride was substantially absent so that the reaction mixture comprised half ester derivatives with an average functionality of two. 14 Grams (0.037 mole) of bisphenol A diglycidyl ether were added, the corrected acid value of the reaction mixture then being 31 mg.KOH/g. After reaction at 110°C. for 7 hours, the acid value of the resin solution was 11 mg. KOH/g. (i.e. 16 mg. KOH/g. calculated for 100% non-volatiles indicating reaction of 65% of the carboxyl groups present in the reaction mixture. The theoretically possible extent of reaction of carboxyl groups based on the amount of diepoxide used is 74%. The molecular size distribution of the solvent-free resin, characterized by gel permeation chromatography, comprised sizes up to 7,000A with a broad maximum from 100 to 400A.

The concentration of the final resin was adjusted to 50% solids concentration and a suitable viscosity for brushing by adding 16 grams of white spirit and 24 grams of diacetone alcohol giving a 3:1 ratio or white spirit/diacetone alcohol in the final resin solution. As an alternative butanol could be used but was not preferred due to its irritating smell.

Unpigmented coatings containing the drier cobalt naphthenate (0.05% cobalt as naphthenate on the drying oil content of the resin) were applied, e.g., by brushing or a doctor blade, to various substrates including aluminum, glass and polyethylene tetrephthalate (Melinex) film for test purposes. The resulting coating thickness was about 25 microns. The coatings dried by oxidative polymerization to a touch dry stage in about 2 hours and after ageing for one week at 20°C. showed satisfactory coating performance.

The scratch hardness was about 1,000 grams. Flexibility (assessed qualitatively by creasing coatings on Melinex film) was good with no cracking under test. The coatings performed well on immersion in distilled water at room temperature with only slight softening and microblistering after 2 days.

A paint was prepared by ball-milling rutile titanium dioxide for 20 hours with the above resin in amounts corresponding to 3 parts pigment to 4 parts solid resin by weight. A high degree of pigment dispersion was obtained as indicated by a Hegman fineness of grind gauge. Cobalt drier (as cobalt naphthenate) was added to the final paint which had good flow properties and dried in about two hours. Coatings exhibited good glass comparable to conventional gloss paints, as shown by specular reflectance measurements at 45° made according to British Standard 3900, Part D.2. After one week at 20°C. they were hard (having a scratch hardness value of 1500 grams) with good flexibility and water resistance as assessed by the tests described above.

EXAMPLE II (Preparation of drying oil resin from sucrose trilinseedate dodecenyl succinic anhydride and bisphenol A diglycidyl ether using 1:1 mole ratio of diepoxide/di-half ester).

A resin of the type described in Example I was prepared by reacting under identical conditions 19.0 grams (0.05 mole) of bisphenol A diglycidyl ether with 82.7 grams (0.05 mole) of the di-half ester derivative (having an acid value of 34 mg. KOH/g.) obtained from 56.1 grams sucrose trilinseedate and 26.6 grams of dodecenyl succinic anhydride in 56 grams of white spirit. The acid value at the second stage, after allowing for addition of diepoxide, was 30 mg. KOH/g. and at the end of reaction 2.6 mg. KOH/g. (i.e., 4 mg. KOH/g. calculated for 100% non-volatiles). This indicated that 90% of the theoretically possible extent of reaction of epoxide and carboxyl groups had occurred. The resin contained molecular sizes up to 20,000A with a broad maximum from 100 to 600A. Unpigmented coatings containing the drier cobalt naphthenate (0.05% cobalt as naphthenate on the drying oil content of the resin) were touch dry after about 1-½ hours. After ageing one week at 20°C. they showed better water resistance than coatings described in Example I, little microblistering being evident during two days immersion. Scratch hardness was about 1,300 grams.

The performance of paints, produced from that product was similar to those described in Example I, above.

EXAMPLE III (Preparation of resin of Example II using triethylamine as catalyst for the diepoxide/di-half ester reaction).

A resin of equivalent composition to that described in Example II above was prepared using 0.25 gram of triethylene as catalyst (i.e. about 0.25% of the weight of solid reactants) for the second stage of the process. The acid value of the reaction mixture was reduced to about 1.2 after only three hours at 110°C. indicating about 95% extent of reaction of carboxyl and epoxide groups. Molecular sizes up to 3,500A were present with a broad maximum from 100 to 300A. Unpigmented coatings containing the drier cobalt naphthenate in the same proportion as in Example I were touch dry after 1-½ hours.

EXAMPLE IV (Preparation of resin with low linseed content from sucrose trisoyate monolinseedate, dodecenyl succinic anhydride and bisphenol A diglycidyl ether using 1:1 mole ratio of diepoxide/di-half ester).

A solution of 34.3 grams (0.025 mole) of crude sucrose trisoyate monolinseedate (obtained by esterifying 8.55 grams (0.025 mole) of sucrose with 21.75 grams (0.075 mole) of methyl esters of soya fatty acids and 7.25 grams (0.025 mole) of methyl esters of linseed fatty acids), in 30 grams of white spirit was reacted stepwise with 13.3 grams (0.05 mole) of dodecenyl succinic anhydride and 9.5 grams (0.025 mole) bisphenol A diglycidyl ether by the method described in Example I. The sucrose ester contained 8% potassium soaps as determined by ashing to constant weight at 700°C. and 15% unreacted methyl esters. After the first stage, the acid value of the reaction mixture was 35 mg. KOH/g. indicating the formation of a di-half ester derivative. At the second stage, the corrected acid value allowing for the addition of diepoxide was 31.2 mg. KOH/g. and after reaction 2 mg. KOH/g. (i.e., 3 mg. KOH/g. for 100% non-volatiles). This corresponds to about 94% extent of reaction of epoxide and carboxyl groups. Gel permeation chromatography showed that the resin comprised molecular sizes up to 4,000A with a broad maximum from 100 to 500A.

Solutions of the resin and a titanium dioxide paint were made up with cobalt naphthenate as drier in the proportion described in Example I and in the manner described in that example. Coatings were touch dry in about 2 hours. In comparison the corresponding paints prepared from a commercial linseed alkyd resin (Paralac 10) or soya alkyd resin (Synolac 29W) dried in about 3 or 4 hours. The results of tests on films aged for one week at 20°C. are described below. Unpigmented and paint coatings just passed loads of 1,400 to 1,700 grams in the scratch hardness test which are comparable to the values obtained from titanium dioxide paint coatings obtained using a linseed alkyd resin (Paralac 10) and superior to the corresponding paints from a soya alkyd resin (Synolac 29W) which had scratch hardness of 1,000 grams in place of the sucrose resin of the invention. They had good flexibility (as shown by the absence of cracking on creasing coatings applied to Melinex) comparable to paints based on the above commercial alkyd resins aged under the same conditions, they also had good water resistance (as evidenced by slight softening but no blistering after two day's immersion in water at room temperature) whereas paints based on the soya alkyd (Synolac 29W) showed slight dulling after about 1 week's immersion. The sucrose resins paint coatings were completely broken down by cold 1% sodium hydroxide after about 1 hour which is similar to the behavior of soya alkyd paint films. Titanium dioxide pigmented paint films had gloss values of 90 to 100 (as determined by specular reflectance measurements as set out in Example I) comparable to conventional paints of the types described above. The paint also showed good resistance to cracking and detachment from an aluminum substrate when subjected to gradual deformation by indentation, paint failure being observed at 5 mm. depth of indentation according to the test set out in British Standard B.S. 3900, Part E. Tinted paints prepared using a 19:1 ratio of titanium dioxide/phthalocyanine blue or red iron oxide also showed good performance.

Coatings of this system remained more flexible after ageing than those described in the above Examples. After 1 year coatings on Melinex could still be creased without cracking.

As can be seen from these results, paint coatings containing the sucrose resins of the invention had properties which were comparable and in some cases superior to paint coatings obtained using commercially available alkyd resins.

EXAMPLE V (Preparation of semi-drying oil resin from sucrose trisoyate dodecenyl succinic anhydride and bisphenol A diglycidyl ether using 0.74:1 mole ratio of diepoxide di-half ester).

56.5 Grams (0.05 mole) of crude sucrose trisoyate (obtained by interesterifying 17.1 grams of sucrose with 43.5 grams (0.15 mole) of methyl esters of soya fatty acids) in 56 grams of white spirit were reacted stepwise with 26.6 grams (0.1 mole) of dodecenyl succinic anhydride and 14 grams (0.037 mole) of bisphenol A diglycidyl ether under the conditions described in Example I above. The reaction mixture comprising di-half ester intermediates, had an acid value of 34 mg. KOH/g. and, after addition of bisphenol A diglycidyl ether, 30.9 mg. KOH/g. After reaction at 110°C. for 6 hours the resin solution had an acid value of 10 mg. KOH/gm. (i.e. 15 mg. KOH/g. calculated for 100% non-volatiles). This result corresponds to 67.5% extent of reaction of available carboxyl groups compared with 74% calculated from the amount of diepoxide used. Molecular sizes up to 3,000 A were present in the resin with a broad maximum from 100 to 400A.

Coatings from a 50% solution of resin in 3:1 white spirit/butanol containing cobalt naphthenate as drier (in the same proportion as in Example I) were touch dry after three hours. The rate of hardening was slow and films were quite soft after 2 days at 20°C.

EXAMPLE VI (Preparation of semi-drying oil resin from sucrose tetrasoyate, dodecenyl succinic anhydride and bisphenol A diglycidyl ether using 1:1 mole ratio of diepoxide/di-half ester).

A solution of 34.8 grams (0.025 mole) of crude sucrose tetrasoyate (obtained by interaction of 8.6 grams (0.025 mole) of sucrose with 29.5 grams (0.1 mole) of methyl soyate) in 20 grams of white spirit was reacted stepwise as described in Example I with 13.3 grams (0.05 mole) of dodecenyl succinic anhydride and 9.5 grams (0.025 mole) of bisphenol A diglycidyl ether. The sucrose ester contained 8% potassium soaps determined as in Example IV. The acid value of the reaction mixture containing di-half ester was 41 mg. KOH/g. After addition of diepoxide, the mixture had an acid value of 36 mg. KOH/g., which was reduced to 4 mg. KOH/g. (i.e. 5.4 mg. KOH/g. calculated for 100% non-volatiles) after four hours at 100°C. This result corresponds to 89% extend of reaction of carboxyl and epoxide groups. The resin had molecular sizes up to 3,500A with a broad maximum from 100 to 400A. Coatings from 50% solution of resin in 3:1 white spirit/diacetone alcohol containing cobalt naphthenate as drier (in the proportion specified in Example I) were touch dry in 3 hours at 20°C. and hardened up more rapidly than sucrose trisoyate-based resin films of Example V. Thus, coatings aged one week just passed a load of 1,300 grams in the scratch hardness test as compared with 1,000 grams for the sucrose trisoyate system.

Flexibility (assessed by creasing coatings on Melinex) was very good even after ageing for 1 year, no cracking being evident under test.

Paints with similar performance to the above unpigmented coatings were prepared using titanium dioxide or 19:1 mixtures of titanium dioxide and phthalocyanine blue or red iron oxide.

EXAMPLE VII (Preparation of drying oil resin from sucrose trilinseedatemonotungate, dodecenyl succinic anhydride and vinyl cyclohexene dioxide using 1:1 mole ratio of diepoxide/di-half ester).

34.3 Grams (0.025 mole) of crude sucrose trilinseedatemonotungate, (obtained by interaction of 8.55 grams (0.025 mole) of sucrose with 21.75 grams (0.075 mole) of methyl linseedate and 7.25 grams (0.025 mole) of methyl tungate in 35.3 grams of white spirit) were reacted stepwise with 13.3 grams (0.05 mole) of dodecenyl succinic anhydride at 100°C. for 2 hours and then 3.5 grams (0.025 mole) of vinyl cyclohexene dioxide with 0.1 grams of triethylamine as catalyst at 110°C. for 4 hours. The reaction mixture had an acid value of 34.5 mg. KOH/g. showing the presence of half-ester derivatives with an average functionality of two. After addition of diepoxide, the acid value of the mixture was 33.1 mg. KOH/g. and after reaction 6 mg. KOH/g. (i.e., 10 mg. KOH/g. for 100% non-volatiles) indicating 84% extend of reaction of carboxyl and epoxide groups. Molecular sizes up to 1,500 A were present with broad maximum from 100 to 250 A.

The resin dissolved in white spirit to give a 55% solution which was suitable for direct brush application. Coatings containing cobalt naphthenate as drier in the porportion used in Example I were touch dry after three hours. They hardened up more slowly than the coatings describe in Example II above when the diepoxide reactant was bisphenol A diglycidyl either. Coatings from the vinyl cyclohexene dioxide resin, after one week at 20°C. also showed lower scratch hardness (about 1000 grams) and water resistance (softening after a few hours immersion, although without blistering or blushing).

EXAMPLE VIII (Preparation of a water-dispersible sucrose resin).

A solution of 20 grams of sucrose resin obtained according to Example I, was dissolved in 30 grams of toluene and reacted with 4 grams of soya fatty acid/maleic anhydride adduct (Admerginate acid) for 2 hours at 100°C. The reaction mixture had an acid value of 22 mg. KOH/g. Toluene was removed under vacuum and the solvent-free resin swelled in 10 grams of butyl cellosolve, which is a typical cosolvent required for the satisfactory preparation of conventional water dispersed alkyd resins. One half of the solution was mixed with 1.1 grams of triethylamine (equivalent to all the carboxyl groups in the resin) and 15 grams of water. The corresponding equivalent amount of ammonia in 15 grams of water was added to the other half. Satisfactory dispersions were obtained in both cases by shaking for a few hours and cobalt naphthenate as drier in the same proportion as specified in Example I was added. Coatings on aluminum dried in 3 to 4 hours after one week at 20°C. the scratch hardness was 1,100 grams for both systems. The films were less water resistant than the corresponding solventbased resin coatings of EXAMPLE I, softening (but not blushing) after immersion in water for about one hour.

EXAMPLE IX (Preparation of semi-drying oil resin from sucrose-tetrasoyate, phthalic anhydride and bisphenol A diglycidyl ether using 0.74:1 mole ratio of diepoxide/di-half ester).

34.7 grams (0.025 mole) of crude sucrose tetrasoyate and 7.4 grams (0.05 mole) of phthalic anhydride in 23 grams of xylene were reacted under nitrogen for two hours with stirring. The acid value of the reaction mixture was 45.5 mg. KOH/g., using either acetone or ethanol/xylene as solvents for the titration. This value corresponds closely to that calculated for a solution containing di-half ester derivatives, i.e. 44 mg. KOH/g. Slight darkening of the reaction mixture was noted at this stage. 7.0 grams (0.0185 mole) of bisphenol A diglycidyl ether were added to give a mixture having an acid value of 40.5. After heating at 110°C. for 2½ hours, the acid value fell to 19 mg. KOH/g. (i.e. 28 mg. KOH/g. calculated for 100% non-volatiles) which was not reduced significantly by further heating. This results indicates reaction of 53% of carboxyl groups present in the reaction mixture. The product was dark colored and had a charred smell. Molecular sizes in the resin ranged from 90 to 20,000 A. Films from a 50% solution of resin in xylene containing cobalt naphthenate drier in the same proportion as in Example 1 were touch dry after 2 hours.

EXAMPLE X (Preparation of resin of the type described in Example IX using 1:1 mole ratio of diepoxide/di-half ester).

The experiment described in Example IX above, was repeated using 9.5 grams diepoxide aiming to produce a resin with low acid value. After heating for 3½ at 110°C. in the second stage of the reaction, a gel was formed.

EXAMPLE XI (Preparation of sucrose resin by a one-stage reaction using 1:2:1 mole of sucrose trilinseedate, phthalic anhydride and bisphenol A diglycidyl ether, respectively).

20.8 grams of a solution in xylene containing 13.8 grams (0.0125 mole) of crude sucrose trilinseedate were reacted in a one-stage reaction with 3.7 grams (0.025 mole) phthalic anhydride and 4.6 grams (0.0125 mole) of bisphenol A diglycidyl ether at 110°C. under nitrogen. The anhydride dissolves readily in the hot mixture on stirring. After 4 hours, the reaction mixture showed signs of gelation the acid value being 5.5 mg. KOH/g. This corresponds to about 92% conversion of carboxyl groups present as phthalate half ester. Xylene was added to give a 50% solution of resin which was filtered through muslin to remove a small amount of gelatinous material. The resin comprised a broad molecular size distribution up to over 10,000 A with a maximum from 50 to 800 A. Coatings containing cobalt naphthenate as drier in the proportion set out in Example I were touch dry after about 2½ hours. After one week at 20°C. they were soft with a scratch hardness of about 400 grams.

EXAMPLE XII (Preparation of a resin with a low linseed oil content by a one-stage reaction from sucrose trisoyate monolinseedate, phthalic anhydride and bisphenol A diglycidyl ether using a 0.75 mole proportion of diepoxide).

A solution of 17.5 grams (0.0125 mole) of crude sucrose trisoyate monolinseedate obtained as in Example IV) in 17.5 grams xylene was reacted in a one stage process with 3.7 grams (0.025 mole) of phthalic anhydride and 3.6 grams (0.0094 mole) of bisphenol A diglycidyl ether under nitrogen at 110°C. for 3½ hours. After the reaction the acid value of the solvent-free resin was 15 mg. KOH/g. showing that the extent of reaction between craboxyl and epoxy groups was about 92%. Gel permeation chromatography showed that the resin comprised molecular sizes up to about 80,000 A with maxima from 100 to 800 A and from 6,000 to 19,000 A.

The concentration of the final resin solution was adjusted to 43% by addition of white spirit to give a suitable brushing viscosity and cobalt drier (0.05% cobalt on the resin solids, as naphthenate) was added. Unpigmented coatings were touch dry in about 2 hours. The result of tests on films aged for two weeks at 20°C. are described below. They just passed a load of 1,100 grams in the scratch hardness test. They had good flexibility (as shown by the absence of cracking on creasing coatings applied to Melinex) and coatings could still be creased without cracking after 16 weeks.

A paint was prepared by ball-milling rutile titanium dioxide with the above resin in amounts corresponding to a pigment/binder ratio of 0.55:1. Films were touch dry in about 2 hours. Coatings after two weeks ageing performed well on immersion in water with only slight dulling after 1 day and slight microblistering and softening after 4 days. Brushed coatings had satisfactory gloss when measured by the method described in Example I.

EXAMPLE XIII (Preparation of drying oil resin from sucrose dilinseedate, dodecenyl succinic anhydride and bisphenol A diglycidyl ether, using 0.85:1 mole ratio of diepoxide/di-half ester).

21.4 grams (0.025 mole) of crude sucrose dilinseedate (obtained by interesterifying 8.55 grams (0.025 mole) of sucrose and 14.5 grams (0.05 mole) of methyl esters of linseed fatty acids) in 47.3 grams of xylene were reacted with 13.25 grams (0.05 mole) of dodecenyl succinic anhydride as described in Example I. Xylene was used as solvent because of the low solubility of sucrose dilinseedate in white spirit. After two hours at 100°C. the acid value of the reaction mixture was 34 mg. KOH/g., indicating the formation of di-half ester derivatives. 8.07 grams (0.021 mole) of bisphenol A diglycidyl ether and 0.18 gram triethylamine catalyst were then added, the corrected acid value of the reaction mixture being 32.4 mg. KOH/g. After six hours at 110°C. the acid value was 5.5 mg. KOH/g. (i.e., 11.6 mg. KOH/g. calculated for 100% non-volatiles) indicating reaction of over 83% of the carboxyl groups present in the reaction mixture. Molecular sizes in the resin ranged from 100 to 3,500 A.

coatings containing cobalt naphthenate as drier in the same proportion as in Example I were touch dry after 2½ hours. After one week at 20°C., the scratch hardness was about 700 grams. The films showed slight softening after immersion in water for 5 hours but no microblistering.

EXAMPLE XIV (Preparation of a resin with a low linseed oil content by a one-stage reaction using 1:2:0.75:0.5 mole ratio of sucrose trisoyate monolinseedate, phthalic anhydride, bisphenol A diglycidyl ether and butyl glycidyl ether respectively).

A solution of 17.5 grams (0.0125 mole) of crude-sucrose trisoyate monolinseedate (obtained as in Example IV containing 1½% potassium soaps and 10% unreacted methyl esters) in 17.5 grams xylene was reacted in a one stage process with 3.7 grams (0.025 mole) of phthalic anhydride, 3.6 grams (0.0094 mole) of bisphenol A diglycidyl ether and 0.83 gram (0.00625 mole) of butyl glycidyl ether as described in Example XII. After the reaction the acid value of the solvent-free resin was 9 mg. KOH/g. showing that the extent of reaction between carboxyl and epoxy groups was about 84%. Gel permeation chromatography showed that the resin comprised molecular sizes up to 3,000A with a broad maximum from 100 to 500A. The solution as prepared (54% solids) was of brushable viscosity.

Unpigmented coatings containing cobalt naphthenate as drier in the same proportion as in Example I were touch dry in about 2 hours.. They showed good flexibility after 1 year ageing. Clear coatings aged for two weeks at 20°C. just passed a load of 1,150 grams in the scratch hardness test.

Rutile titanium dioxide pigmented coatings (pigment/binder ratio 0.55:1) aged for two weeks at 20°C. showed good water resistance, although this was inferior to the paints described in Example IV from commercial alkyd resins. After 4 days immersion, no microblistering was evident and only slight softening. Films applied by doctor blade on aluminum had very good gloss, values of about 95 to 99 being obtained by the method described in Example I. The scratch hardness was about 1,350 grams. Breakdown of the film occurred after about 35 minutes immersion in cold 1% sodium hydroxide.

EXAMPLE XV

Tests were also carried out on coatings from the corresponding titanium dioxide paint prepared as in Example XIV except the resin (acid value of 10 mg. KOH/g.) was synthesized from soad-free sucrose esters. These were obtained by shaking a solution in methyl ethyl ketone with dilute hydrochloric acid/sodium chloride and therefore contained free fatty acids liberated from the soaps. In this case, improved resistance to cold 1% alkali was observed with breakdown after 1 hour. Other properties were similar to those described in Example XIV for paints from resins based on crude sucrose esters. When resins were prepared from di-half esters based on soap-free sucrose esters, 0.2% benzyl dimethylamine was used as catalyst to obtain a satisfactory rate of reaction.

EXAMPLE XVI (Preparation of semi-drying oil resin from sucrose penta-ester of dehydrated castor oil acids, tetrahydrophthalic anhydride and bisphenol A diglycidyl ether using 1:1 mole ratio of diepoxide /di-half ester).

A penta-substituted sucrose semi-drying oil ester was prepared by interesterifying 68.4 grams (0.2 mole) sucrose with 290 grams (1 mole) methyl esters of dehydrated castor oil acid (containing about 38% conjugated unsaturation and having an acid value of 0.5 mg. KOH/g.) in 150 ml. dimethyl sulphoxide at 90° to 100°C. and about 50 mm. pressure using 6 grams dry potassium carbonate as catalyst. The reaction was substantially complete after 7 hours, 30 grams of methyl alcohol being collected in the cold trap. In fact, only 1 gram distillate was obtained after heating for a further 3 hours with 4 grams more catalyst. 315 grams of sucrose penta-ester was recovered containing 3% potassium soaps determined as in Example IV and about 15% unreacted methyl esters.

42 grams (0.025 mole) of the above sucrose penta-ester in 30 grams white spirit and 7.5 grams (0.05 mole) tetrahydrophthalic anhydride, which has a melting point of 104°C., produced a homogeneous solution after stirring for a few minutes at 110°C. This reaction mixture was heated for a further 2 hours at this temperature under nitrogen. The acid value was 39.2 mg. KOH/g. using acetone as solvent for the titration and 34.5 mg. KOH/g. using a mixture of ethanol and xylene compared with 35 mg. KOH/g. calculated for half ester derivatives with an average functionality of two. These results show that the mixture contained about 1.24% by weight (i.e. about 0.98 gram) unreacted tetrahydrophthalic anhydride. 925 grams (0.025 mole) of bisphenol A diglycidyl ether were added and the resulting mixture, having a corrected acid value of 30.5 mg. KOH/g. heated at 110°C. for 5 hours. The acid value of the final resin solution was 9 mg. KOH/g. (i.e. 13.5 mg. KOH/g. calculated for 100% non-volatile) indicating about 70% reaction of epoxide and carboxyl groups. The molecular size distribution, determined by gel permeation chromatography, comprised sized up to 40,000A with a broad maximum from 94 to 2,800A. A mixture of 11 grams diacetone alcohol and 16 grams white spirit were added to give a 50% resin solution which was then used to prepare a paint by ball-milling for 16 hours with 32.4 g. rutile titanium dioxide. The paint was suitable for brush application without further thinning. The pigment/binder ratio in this case corresponds to 0.55:1 by weight. Cobalt naphthenate as a drier was added in the same proportion as Example I and the resulting paint coatings dried in about 1½ hours. Their performance in various tests after ageing for 2 weeks at 20°C. is described below with reference to paints of similar composition from commercial alkyds. Films just passed a load of 1,600 grams in the scratch hardness test which is comparable to the results obtained with conventional alkyd paints, such as those described in Example IV.

Flexibility (assessed by creasing coatings on Melinex) was good, no cracking being evident in tests carried out on films aged for 10 months, similar to paints from commercial alkyds. Water resistance was comparable to that described for titanium dioxide air-drying alkyd paints in Example IV or a dehydrated castor alkyd paint with only slight softening and little dulling after immersion for 10 days at 20°C.

Little apparent effect was also observed after immersion in 10% aqueous acetic acid at 20°C. Immersion of the sucrose paint films (on Melinex) in a 0.5% aqueous solution of sulphur dioxide at 20°C. for 4 days caused microblistering and softening but little dulling, whereas paint films based on the linseed alkyd (Paralac 10) dulled and softened with loss of adhesion (without microblistering) under tests. A 10% solution of phosphoric acid at 20°C. caused dulling and slight softening (without microblistering) of the sucrose paint after four days. Films on Melinex of the sucrose paint and a linseed alkyd paint with the same titanium dioxide pigment volume concentration showed comparable behavior during immersion in 1% sodium hydroxide at 20°C., incipient breakdown being evident after three hours in both cases. With a titanium dioxide-dehydrated castor alkyd paint, breakdown occurred after 1½ hours. In contrast, the sucrose tetraester based paint of Example IV showed considerable breakdown after 1 hour.

The titanium dioxide sucrose paint of this example had good initial gloss as determined by specular reflectance measurements at 45° and good gloss retention properties during 1,000 hours artificial weathering in a Marr Weatherometer tested according to British Standard B.S. 3900, Section F3 corresponding to about 1½ years in a temperate climate. The gloss of the sucrose paint on aluminum reduced from 95 to 40%; similar reductions in gloss were found with paint films based on a linseed, soya or dehydrated castor alkyd resins.

EXAMPLE XVIII (Preparation of semi-drying oil resin from sucrose penta-ester of dehydrated castor oil fatty acids, tetrahydrophthalic anhydride and vinyl cyclohexene dioxide using 1.1:1 mole ratio of diepoxide/di-half ester).

10.4 grams (0.00625 mole) of crude sucrose penta-ester of dehydrated castor oil fatty acid obtained as in Example XVI, in 5 grams white spirit were reacted under nitrogen with 1.9 grams (0.0125 mole) tetrahydrophthalic anhydride for 2½ hours as described in Example XVI. The acid value of the reaction mixture was 45 mg. KOH/g. using acetone as the solvent for the titration and 39.5 mg. KOH/g. using a mixture of ethanol and xylene. The acid value calculated for a di-half ester intermediate was 40.5 mg. KOH/g. Thus, the reaction mixture contained about 1.5% by weight i.e. about 0.25 grams of unreacted anhydride. In contrast, the corresponding products from sucrose tri-and tetra-substituted esters were shown to be predominantly di-half esters (on average) without unreacted anhydride.

0.88 grams (0.00628 mole) vinyl cyclohexene dioxide was added giving a mixture having an acid value of 42.5 mg. (using acetone as solvent). The reaction was carried out at 110°C. for 4 hours to give a resin with an acid value of 17 mg. KOH/g. The acid value was reduced to 5 mg. KOH/g. by heating for a further 3½ hours at 140°C. after addition of 0.08 gram more vinyl cyclohexene dioxide. Little discoloration occurred as a result of heating at the higher temperature. 2 grams diacetone alcohol and 2 grams white spirit were then added. 16.5 grams of the above solution containing 10 grams of resin were ball-milled with 6 grams of rutile titanium dioxide (corresponding to a pigment/binder ratio of 0.6:1) to give a paint with a satisfactory degree of dispersion as indicated by a Hegman fineness of grind gauge reading. Cobalt naphthenate as drier in the same proportion as in Example I was then added. The non-volatile content of the paint (comprising resin and pigment) was 64% as determined by heating a sample at 120°C. to constant weight. Films applied to aluminum and Melinex dried in about 1½ hours and had good specular gloss. After ageing 2 weeks at 20°C. they were hard, just passing loads of 1,700 grams in the scratch hardness test, and showed good flexibility. Resistance to water was good, no microblistering being noted after immersion for 5 days. The coatings showed inferior resistance to 1% sodium hydroxide relative to those from the corresponding resin of Example XVI prepared from bisphenol diglycidyl ether.

EXAMPLE XVIII (Preparation of a sucrose resin from a half ester intermediate having an average functionality of three, bisphenol A diglycidyl ether and a monofunctional fatty acid (to terminate the chain extension reaction) using mole ratios of 1:1:2 respectively).

10.4 grams (0.00625 mole) of crude sucrose pentaester of dehydrated castor oil fatty acids in 5 grams white spirit were heated with 2.8 grams (0.01875) tetra hydrophthalic anhydride with stirring at 110°C. under nitrogen for 3 hours. The reaction mixture had an acid value of 64 mg. KOH/g. using acetone as solvent for the titration compared with a value of 57 mg. KOH/g. calculated for trihalf ester intermediates. The difference indicated that the reaction mixture contained a small amount of unreacted tetrahydro phthalic anhydride as noted in Examples XVI and XVII.

1.75 grams (0.00625 mole) soya fatty acids in 5 grams white spirit and 4.5 grams (0.01184 mole) bisphenol A diglycidyl ether were added and the mixture (which then had a corrected acid value of 48 mg. KOH/g.) stirred at 110°C. for 6¼ hours. A clear, very viscous solution of the resin having an acid value of 13 mg. KOH/g. was obtained after cooling to room temperature. This contained a small percentage of gel which was filtered off. 8 grams diacetone alcohol and 15 grams white spirit were added to give a 40% solution of resin. Unpigmented films on Melinex or aluminum containing cobalt naphthenate as drier in the same proportion as in Example I, dried in about 1½ hours. After ageing for 1 week they had satisfactory hardness (just passing 1,500 grams in the scratch hardness test) flexibility (as shown by the absence of cracking on creasing coatings on Melinex) and water resistance (no microblistering being noted after 3 days immersion at 20°C).

EXAMPLE XIX (Preparation of a resin with a low linseed oil content by a one stage reaction using 1:2:1 mole ratios of sucrose trisoyate monolinseedate, phthalic anhydride and vinylcyclohexene dioxide respectively).

A solution of 17.5 grams (0.0125 mole) of crude sucrose trisoyate monolinseedate (obtained as in Example IV) in 17.5 grams xylene was reacted in a one stage process with 3.7 grams (0.025 mole) of phthalic anhydride and 1.75 grams (0.0125 mole) of vinylcyclohexene dioxide at 110°C. under nitrogen for 6 hours. After the reaction the acid value of the solvent-free resin was 12 mg. KOH/g. indicating that the extent of reaction between carboxyl and epoxy groups was about 81%. Gel permeation chromatography showed that the resin comprised molecular sizes up to 2,000A with a broad maximum from 100 to 400A. A solution containing 57% resin had brushable viscosity.

Unpigmented coatings showed fairly good flexibility, only slight cracking being noted after creasing a coating on Melinex after ageing 4 weeks. No further deterioration was evident after 12 weeks under test. Coatings aged for two weeks just passed a load of 1,400 grams in the scratch hardness test.

A rutile titanium dioxide pigmented paint (pigment-/binder ratio 0.55:1) was prepared and evaluated as films after ageing for two weeks. They showed good water resistance as evidenced by only slight microblistering after two days immersion and slight softening after 4 days. The films were hard (having a scratch hardness value of about 1,500 grams) and showed good gloss as measured by the methods described in Example I.

EXAMPLE XX (Preparation of semi-drying oil sucrose resins from sucrose trisoyate, tetrahydro phthalic anhydride and a bisphenol A diglycidyl ether oligomer (having an average molecular weight of 900 using 0.93:1 mole ratio of diepoxide/di-half ester).

7.3 grams (0.00625 mole) of crude sucrose trisoyate and 1.9 grams (0.0125 mole) tetrahydrophthalic anhydride were heated under nitrogen with stirring at 110°C. for 2 hours without solvent. A product was obtained having an acid value of 72 mg. KOH/g. (using acetone as solvent for the titration) which corresponds closely to the value calculated for a di-half ester intermediate. This was then reacted at 110°C. for 10 hours with 5.25 grams (0.00583 mole) bisphenol A diglycidyl ether oligomer having an average molecular weight of 900 (Epikote 1001) in 5.25 grams methyl cellosolve acetate (monomethyl ether and acetic acid ester of ethylene glycol). This solvent was necessary to obtain compatibility. The corrected acid value of the mixture before reaction was 41.5 mg. KOH/g. After cooling to room temperature, the light reddish brown resin solution became slightly hazy and very viscous. The acid value was 10 mg. KOH/g. using a mixture of xylene and acetone for the titration indicating about 80% reaction of diepoxide groups. Solubility tests carried out on small samples of solvent-free resin showed that it was incompletely soluble in either xylene or acetone and insoluble in white spirit. The viscous solution was thinned to a suitable viscosity for brush application with 10 grams xylene and 7 grams diacetone alcohol. Films on Melinex containing cobalt naphthenate drier in the same proportion as in Example I were touch dry in 2 hours. After ageing for two weeks, they became rather brittle and showed inferior water resistance.

EXAMPLE XXI (Preparation of a resin with a low linseed oil content from sucrose trisoyate monolinseedate, dodecenylsuccinic anhydride and a bisphenol A diglycidyl ether oligomer having an average molecular weight of 900 using 1:1 mole ration diepoxide/di-half ester).

A solution of 17.5 grams (0.0125 mole) of crude sucrose trisoyate monolinseedate (obtained as in Example IV) in 11.8 grams of xylene was reacted with 6.65 grams (0.025 mole) of dodecenylsuccinic anhydride at 110°C. for 2 hours under nitrogen. At this stage of the reaction the acid value of the solution was 39 mg. KOH/g. indicating that unreacted anhydride was substantially absent so that the mixture comprised half-ester derivatives with an average functionality of two. To this mixture was added 11 grams (0.0125 mole) a bisphenol A diglycidyl ether oligomer of average molecular weight 900 and, necessarily, 11 grams of cellosolve acetate to produce a homogeneous reaction mixture. The corrected acid value of the solution was now 24 mg. KOH/g. The mixture was heated at 110°C. under nitrogen and slowly stirred mechanically. The mixture, which was cloudy at the outset, became clear after about half an hour. After 6 hours of reaction the acid value of the solution was 12 mg. KOH/g. 0.25% of triethylamine catalyst was added and the heating was continued for another 4 hours when the acid value of the solution fell to 9 mg. KOH/g. A further 0.025% triethylamine was added and the heating continued for a further 8 hours. The final acid value was 11 mg. KOH/g. for the solvent-free resin. The extent of reaction between carboxyl and epoxy groups was therefore 73%. Gel permeation chromatography showed that the resin comprised molecular sizes up to 3,000A with a broad maximum from 100 to 300A. The resin solution was too viscous for brushing and was thinned with xylene to 40% solids concentration.

Unpigmented films, containing cobalt naphthenate as drier in the same proportion as in Example I, showed good flexibility after ageing for 3 months. The scratch hardness values of films after two weeks were about 1,450 grams.

A rutile titanium dioxide pigmented paint (pigment/binder ratio 0.85:1) was prepared and tests carried out on films aged for two weeks at 20°C. On immersion in water for 3 days, dulling was evident but no microblistering. Gloss and scratch hardness values were satisfactory.

EXAMPLE XXII (Preparation of resin with low linseed content from sucrose trisoyate monolinseedate, tetrahydrophthalic anhydride and a bisphenol A diglycidyl ether oligomer of average molecular weight of 900 using 1:1 mole ratio of diepoxide/di-half ester).

A solution of 17.5 grams (0.0125 mole) of crude sucrose trisoyate monolinseedate (obtained as described in Example IV) in 11.8 grams of xylene was reacted with 3.8 grams (0.025 mole) of tetrahydrophthalic anhydride at 110°C. for 2 hours under nitrogen. Acid value determinations indicated that, at this stage, unreacted anhydride was substantially absent so that the mixture comprised half-ester derivatives with an average functionality of two. To the mixture was added 11 grams (0.0125 mole) of a bisphenol a diglycidyl ether oligomer of average molecular weight 900 and, necessarily, 11 grams of cellosolve acetate to achieve compatibility. The corrected acid value of the solution was then 25 mg. KOH/g. 0.5% (by weight of reactants) of triethylamine was added as catalyst and the mixture heated at 110°C. under nitrogen stirring for about 1 hour until the mixture became homogeneous. After 11 hours, the acid value of the solution was 10 mg. KOH/g. (i.e. 15 mg. KOH/g. for the solvent free resin) indicating 65% reaction between carboxyl and epoxy groups. The solution was suitable for brush application after thinning to 35% solids concentration with xylene.

Unpigmented films containing cobalt naphthenate as drier in the same proportion as in Example I were touch dry in about 2 hours. Their flexibility was inferior to those from similar resins based on diepoxide oligomers described in Examples XXI and XXIV. The scratch hardness of films aged for two weeks was about 1,550 grams.

A rutile titanium dioxide paint having a pigment/binder ratio of 0.55:1 was prepared. Films containing cobalt naphthenate drier in the above proportion were touch dry after 2 hours and had good gloss. The scratch hardness was 1,500 grams. Films aged for two weeks showed very good water resistance, only slight softening being evident after immersion for 4 days in distilled water at 20°C. Very slight microblistering occurred after 7 days and the film still had good gloss. Films (on Melinex) showed superior alkali resistance to commercial long oil alkyd coatings, assessed by immersion in 1% aqueous sodium hydroxide up to 3 days.

EXAMPLE XXIII (Preparation of resin from sucrose tetrasoyate, tetrahydrophthalic anhydride, soya dimer fatty acid and a bisphenol A diglycidyl ether oligomer of average molecular weight 900 using 1:0.75:0.25 mole ratio of diepoxide/di-half ester/dimer acid).

17.3 grams of crude sucrose tetrasoyate (0.0125 mole), obtained as described in Example VI, was reacted in absence of solvent with 3.8 grams (0.025 mole) of tetrahydrophthalic anhydride at 110°C. for 2 hours under nitrogen. At this stage, the acid value was 70 mg. KOH/g. indicating that unreacted anhydride was substantially absent and the product contained half ester derivatives with an average functionality of two. The product was dissolved in 21.1 grams of xylene. To this solution was added 2.3 grams (0.00417 mole) of soya dimer fatty acids (Dimac S) and 15.1 grams (0.0167 mole) of a bisphenol A diglycidyl ether oligomer of average molecular weight 900. 10.4 grams of cellosolve acetate were also added to achieve compatibility of the reactants during the second stage of the process. The corrected acid value of the solvent-free resin was 49 mg. KOH/g. The mixture was heated under nitrogen at 110°C. with frequent shaking initially to produce a homogeneous solution. After 12 hours, the acid value of the resin (calculated for 100% nonvolatiles) was 12 mg. KOH/g. indicating 78% reaction between carboxyl and epoxy groups. Gel permeation chromatography showed that the resin comprised molecular sizes up to 9,000A with a broad maximum from 100 to 400A. The resin solution was thinned to 50% solids concentration with diacetone alcohol and then to 45% concentration with 3:1 mixture (by weight) of xylene and diacetone alcohol.

Unpigmented films containing cobalt naphthenate drier were touch dry in about two hours. Films aged for two weeks at 20°C. were significantly more flexible although as expected, softer than those of Example XXII, because of the addition of the dimer fatty acid to reaction mixture. The coatings blushed after several hours immersion in water at 20°C. but little microblistering was evident after 7 days.

EXAMPLE XXIV (Preparation of a resin from sucrose tetrasoyate, tetrahydrophthalic anhydride and a bisphenol A diglycidyl ether oligomer having an average molecular weight of 470 using 1:1 mole ratio of diepoxide/di-half ester).

A solution of 34.6 grams (0.025 mole) of crude sucrose tetrasoyate (obtained as described in Example VI) in 23.0 grams xylene was reacted with 7.6 grams (0.05 mole) of tetrahydrophthalic anhydride at 110°C. for 2 hours under nitrogen. At this stage the acid value of the solution was 44 mg. KOH/g. indicating that unreacted anhydride was substantially absent so that the mixture comprises half ester derivatives, with an average functionality of two. To the mixture was added 11.7 grams (0.025 mole) of a bisphenol A diglycidyl ether oligomer of average molecular weight 470 (Epikote 834). The corrected acid value of the solution was now 36 mg. KOH/g. The heating was continued under the above conditions and after 3½ hours the acid value of the solution was 7 mg. KOH/g. (i.e., 9 mg. KOH/g. for the solvent-free resin) indicating 82% extent of reaction between carboxyl and epoxy groups. The resin solution was thinned to 55% solids concentration with xylene and diacetone alcohol to give finally 3:1 ratio of these solvents. Further thinning with butanol to 50% concentration was still necessary to give a solution suitable for brush application.

Unpigmented coatings containing cobalt naphthenate drier in the same proportion as in Example I were touch dry after about two hours. They had good flexibility and good water resistance. Slight hazing only occurred after immersion in distilled water at 20°C. for 3 days. Scratch hardness was about 1,300 grams.

A rutile titanium dioxide pigmented paint (pigment-/binder ratio 0.55:1) was made and tested. Films were touch dry in about two hours and had good gloss, flexibility and water resistance. Only slight microblistering occurred after 3 days immersion in distilled water at 20°C. and dulling after 7 days. The scratch hardness was about 1,050 grams.

EXAMPLE XXV (Preparation of a semi-drying oil resin from sucrose monotallate, phthalic anhydride and bisphenol A diglycidyl ether using 1:1 mole ratio of dihalf ester/-diepoxide).

Sucrose monotallate was prepared by interesterifying 58.8 g. (0.2 mole) methyl esters of tall oil fatty acids containing 1% rosin acids with 205.2 g. (0.6 mole, i.e. 2 moles excess based on the methyl tallate) sucrose in 500 ml. dimethyl sulphoxide at 90°to 100°C. and 50 mm. under nitrogen using 0.6 g. dry potassium carbonate as catalyst. The reaction was complete in four hours as indicated by the quantity of methanol collected in the cold traps. The reaction mixture was cooled, filtered through muslin and the filtrate extracted twice with 40°-60°petroleum ether to remove unreacted methyl esters. The dimethyl sulphoxide was substantially removed by vacuuum distillation using a rotary evaporator. The residue was dissolved in hot toluene, cooled and centrifuged to separate excess sucrose. The supernatant liquid was concentrated under vacuum, finally at 1 mm. It contained 2% potassium soaps. These were converted to free fatty acids by titrating a solution of the product in a 1:1 mixture of cyclohexane/butanol with 0.1 N hydrochloric acid until it was just acid, using bromophenol blue as indicator. The solvent was distilled off at 100°C. finally under vacuum. The product had an acid value of 5 mg. KOH/g. and a saponification value (corresponding to that calculated for a sucrose mono-$C_{18}$ fatty ester) of 93 mg. KOH/g.

A resin was prepared by heating 15.1 g. (0.025 mole) of the product in 21.7 g. toluene with 7.4 g. (0.05 mole) phthalic anhydride and 10 g. (0.026 mole) of bisphenol A diglycidyl ether under nitrogen at 110°C. Considerable darkening of the mixture occurred. After 6 hours, the acid value based on solvent-free resin was 6 mg. KOH/g. indicating 92% reaction of carboxyl and epoxy groups. The concentration of the resin solution was adjusted to 50% with a 1:1 mixture of xylene and diacetone alcohol. 0.05% cobalt as naphthenate drier, based on resin solids, was added. Films dried satisfactorily after a few hours but after 4 days ageing were very brittle.

EXAMPLE XXVI (To illustrate the adverse effecte of potassium soaps on the properties of air-dried films from resins of the type described in Example XVI synthesized from sucrose penta-esters of dehydrated castor fatty acids).

Resins having acid values of 8.3 and 7.4 mg. KOH/g. respectively were synthesized as described in Example XVI from sucrose penta-dehydrated castor esters containing 9% potassium soaps and from the corresponding partially purified ester containing 7.7% potassium soaps. (The latter was obtained by shaking a solution in hexane with dilute zinc sulphate separating water and insoluble zinc soaps formed by double decomposition and recovering the product by distillation). Titanium dioxide paints containing 0.05% cobalt as naphthenate drier were prepared as in Example XVI and tests carried out on films applied to Melinex and aluminum as indicated in the Table below. The results obtained with the paint of Example XVI are also given for comparison. The table illustrates the adverse effect of large amounts of potassium soaps on gloss, and resistance to water or 1% alkali.

TABLE

| Potassium soap content of sucrose ester used for preparation of resin | Test | | |
|---|---|---|---|
| | Gloss specular reflectance at 45° on Aluminum | Resistance to water (immersion on Melinex) | Resistance to 1% NaOH (immersion on Melinex |
| 9.0% | 80 | film microblisters after 5 days | breakdown of film after 1 hour |
| 7.7% | 90 | film microblisters after 23 days | breakdown of film after 1½ hours |
| 3.0% (Example XVI) | 95 | film microblisters after 23 days | breakdown of film after about 3 hours |

As can be seen from the Table, the lower the potassium soap content, the lower the water and cold alkali resistance of the resulting paint film.

All three paints exhibited comparable hardness flexibility and gloss retention during 1,000 hours of artifical weathering.

EXAMPLE XXVII (To illustrate the extent of side reactions involving epoxide groups during synthesis of resins by reaction of sucrose partial drying oil ester, cyclic anhydride and diepoxide).

A resin of the type described under Example XVI was prepared from sucrose penta-dehydrated castor esters (containing 3.7% potassium soaps and 15% unreacted methyl esters) by reaction, stepwise, with 2 mole proportions of tetrahydrophthalic anhydride at 110°C. and 1 mole proportion of bisphenol diglycidyl ether at 140°C. in absence of tertiary amine catalyst. At the start of the second step the solvent-free reaction mixture had an acid value of 48.4 mg. KOH/g. and an epoxide value of 0.0886 epoxide equivalents/100 g. After 6 hours at 140°C., the acid and epoxide values were respectively 16.4 mg. KOH/g. and 0.01605 epoxide equivalents/100 g. (Epoxy groups were determined by reaction with hydrochloric acid/pyridine according to the method described in the chapter by R.E. Burge and B.P. Geyer in G.M. Kline (Editor) *Analytical Chemistry of Polymers*, Part 1, Interscience Publishers Inc. New York). The results indicate 66% and 87% reaction of carboxyl and epoxide groups, respectively. Therefore 21% of the epoxide groups enter into side reactions, possibly etherification by reaction with hydroxyl groups.

A resin of the type described in Example XIV was prepared from sucrose trisoyate linseedate (containing 1-½ potassium soaps and about 10% unreacted methyl esters) by one stage reaction with 1.85:0.75:0.5 mole proportions respectively of phthalic anhydride, bisphenol A diglycidyl ether and butyl glycidyl ether at 110°C. in absence of tertiary amine catalyst. The acid and epoxide values of the solvent-free mixture before reaction were respectively 47.7 mg. KOH/g. and 0.103 epoxide equivalents/100 g. and after 5 hours at 110°C., 8 mg. KOH/g. and 0.007 epoxide equivalents/100 g. The calculated final epoxide value corresponding to reaction of epoxide with carboxyl groups only should be 0.03 epoxide equivalents/100 g. About 20% of the epoxide groups were, therefore, involved in side reactions.

EXAMPLE XXVIII (Stoving finish from sucrose based resin)

A mixture comprising 5 parts by weight of a 60% solution of resin of the type described under Example XVI in white spirit and 1.66 parts of a 60% solution of a butylated melamine-formaldehyde resin ("Beetle" BE 615) in butanol was coated on to aluminum phosphated mild steel and Melinex test substrates. After stoving at 120°C. for ½ hour, the coatings showed very good resistance to 5% sodium hydroxide (immersion on Melinex at 20°C.). Although partial breakdown was evident after 2 hours, an appreciable amount of film was still attached to the substrate after 5 days. Adhesion to aluminum and phosphated steel was very good with no adhesion failure as determined by cross hatch test. The films had satisfactory hardness just passing 1,400g. on aluminum and 1,700 g. on phosphated steel in the scratch hardness test.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. An oil-modified sucrose resin which is the reaction product at reaction temperatures below those at which substantial charring or decomposition of the sucrose takes place of (a) a sucrose partial ester wherein the ester groups are derived from the class consisting of fatty acids, aromatic acids, and vegetable and marine oil unsaturated fatty acids of the drying oil, semi-drying oil and non-drying oil types, and mixtures thereof, (b) at least about two moles of a cyclic dicarboxylic acid anhydride per mole of sucrose partial ester and (c) about 0.7 to about 3 moles of a diepoxide per mole of sucrose partial ester.

2. A resin according to claim 1, wherein the sucrose partial ester contained an average of between about 1 and 5 ester group substituents per sucrose unit.

3. A resin according to claim 1, wherein the sucrose partial ester contained an average of between about 4 and 5 ester group substituents per sucrose unit.

4. A resin according to claim 1, wherein the ester groups of the sucrose partial ester have been derived from vegetable oil unsaturated fatty acids of the drying oil type.

5. A resin according to claim 1, wherein the ester groups of the sucrose partial ester have been derived from a vegetable oil unsaturated fatty acid of the semi-drying oil type.

6. A resin according to claim 1, wherein the ester groups of sucrose partial ester have been derived from a vegetable oil saturated fatty acid of the non-drying oil type.

7. A resin according to claim 1, wherein the ester groups of the sucrose partial ester have been derived from dehydrated castor oil.

8. A resin according to claim 1, wherein the cyclic dicarboxylic acid anhydride is a member selected from the class consisting of dodecenylsuccinic, nonenylsuccinic, soya acid/maleic anhydride adduct, tetrahydrophthalic, maleic, phthalic, and succinic anhydrides.

9. A resin according to claim 1, wherein a part of the cyclic dicarboxylic anhydride has been replaced by a dimer fatty acid.

10. A resin according to claim 1, wherein the diepoxide is bisphenol A diglycidyl ether.

11. A process for the preparation of an oil-modified sucrose resin which comprises reacting at temperatures below those at which substantial charring or decomposition of the sucrose takes place (a) a sucrose partial ester wherein the ester groups are derived from the class consisting of fatty acids, aromatic acids, and vegetable and marine oil unsaturated fatty acids of the drying oil, semi-drying oil and non-drying oil types, and mixtures thereof, (b) at least about two moles of a cyclic dicarboxylic acid anhydride per mole of sucrose partial ester and (c) about 0.7 to about 3 moles of a diepoxide per mole of sucrose partial ester.

12. A process according to claim 11, wherein the ester, anhydride and diepoxide are mixed and heated together.

13. A process according to claim 11, wherein a mixture of the ester and anhydride are heated together to produce a sucrose dihalf ester intermediate and this intermediate is then heated with the diepoxide to produce the oil-modified sucrose resin.

14. A process according to claim 11, wherein the reaction is effected at a temperature of from about 20° to 120°C.

15. A process according to claim 11, wherein the reaction is effected at a temperature of between about 100° and 110°C.

16. A process according to claim 11, wherein the sucrose partial ester contains an average of between about 1 and 5 ester group substituents per sucrose unit and the reaction is effected at a temperature of at least about 140°C., but below that at which substantial charring occurs.

17. A process according to claim 11, wherein the reaction is effected in the presence of an alkaline catalyst.

18. A process according to claim 17, wherein the alkaline catalyst is a soap present as an impurity in the sucrose partial drying oil ester.

19. A process according to claim 11, wherein the process is effected in a solvent in which at least the sucrose ester and anhydride are soluble.

20. A process according to claim 11, wherein the ester, anhydride and diepoxide are condensed in the relative molar proportions of about 1 : about 2 : 0.7 to 1.

21. An oil-modified sucrose resin according to claim 1, in which free hydroxyl groups in the resin have been esterified with a cyclic anhydride to provide additional carboxyl groups and which are made water-dispersible by conversion of carboxyl groups in the resin to salt groups.

22. A water-dispersible resin according to claim 21, wherein the carboxyl groups have been reacted with ammonia or a tertiary amine.

23. A coating composition containing a solvent, an oil-modified sucrose resin according to claim 1, and a drying additive.

24. A coating composition containing a solvent, a water dispersible resin according to claim 21, and a drying additive.

25. A resin according to claim 1 wherein the reaction temperature is about 20° to about 140°C.

26. A process according to claim 11 wherein the temperature is about 20° to about 140°C.

27. A coating composition according to claim 23 further including a pigment or filler.

28. A coating composition according to claim 24 further including a pigment or filler.

* * * * *

UNITED STATES PATENT OFFICE
CERTIFICATE OF CORRECTION

PATENT NO. : 3,870,664
DATED : March 11, 1975
INVENTOR(S) : Raymond N. Faulkner

It is certified that error appears in the above-identified patent and that said Letters Patent are hereby corrected as shown below:

Column 8, line 10, change "glass" to -- gloss --.

Column 10, line 56, change "100°C." to -- 110°C. --.

Column 11, line 16, change "grans" to -- grams --.

Column 12, line 23-24, change "results" to -- result --.

Column 12, line 38, after "3 1/2" insert -- hours --.

Column 12, line 43, after "mole" insert -- ratios --.

Column 13, line 11, change "craboxyl" to -- carboxyl --.

Column 13, line 62, change "coatings" to -- Coatings --.

Column 14, line 46, change "soad-free" to -- soap-free --.

Column 18, line 49, change "ration" to -- ratio --.

Column 19, line 41, change "a", second occurrence, to -- A --.

Signed and Sealed this seventh Day of October 1975

[SEAL]

Attest:

RUTH C. MASON
*Attesting Officer*

C. MARSHALL DANN
*Commissioner of Patents and Trademarks*